(12) United States Patent
Parker et al.

(10) Patent No.: US 6,659,721 B1
(45) Date of Patent: *Dec. 9, 2003

(54) HIGH EFFICIENCY CEILING FAN BLADES

(75) Inventors: Danny S. Parker, Cocoa Beach, FL (US); Guan Hua Su, Rowland Height, CA (US); Bart D. Hibbs, Monrovie, CA (US)

(73) Assignee: University of Central Florida, Orlando, FL (US)

( * ) Notice: Subject to any disclaimer, the term of this patent is extended or adjusted under 35 U.S.C. 154(b) by 88 days.

This patent is subject to a terminal disclaimer.

(21) Appl. No.: 09/976,515

(22) Filed: Oct. 12, 2001

Related U.S. Application Data

(63) Continuation-in-part of application No. 09/711,599, filed on Nov. 13, 2000, which is a division of application No. 09/415,883, filed on Oct. 8, 1999, now Pat. No. 6,189,799, which is a division of application No. 09/067,236, filed on Apr. 27, 1998, now Pat. No. 5,996,898, which is a continuation-in-part of application No. 09/056,428, filed on Apr. 7, 1998, now Pat. No. 6,039,541.

(60) Provisional application No. 60/265,241, filed on Jan. 31, 2001.

(51) Int. Cl.$^7$ .............................................. F04D 29/38
(52) U.S. Cl. ....................... 416/5; 416/223 R
(58) Field of Search ............................. 416/5, 223 R, 416/243, 210 R

(56) References Cited

U.S. PATENT DOCUMENTS

| | | | |
|---|---|---|---|
| 1,506,937 A | 9/1924 | Miller | 416/223 |
| 1,903,823 A | 4/1933 | Lougheed | 416/223 |
| 1,942,688 A | 1/1934 | Davis | 416/223 |
| 2,283,956 A | 5/1942 | Smith | 416/223 |
| 2,345,047 A | 3/1944 | Houghton | 416/223 |
| 2,450,440 A | 10/1948 | Mill | 416/223 |
| 2,682,925 A | 7/1954 | Wosika | 416/226 |
| 4,197,057 A | 4/1980 | Hayashi | 416/242 |
| 4,325,675 A | 4/1982 | Gallot et al. | 416/223 |
| 4,411,598 A | 10/1983 | Okada | 416/223 |
| 4,416,434 A | 11/1983 | Thibert et al. | 416/223 |
| 4,730,985 A | 3/1988 | Rothman et al. | 416/223 |
| 4,782,213 A | 11/1988 | Teal | |
| 4,844,698 A | 7/1989 | Gornstein et al. | 416/223 |
| 4,892,460 A | 1/1990 | Volk | |
| 4,974,633 A | 12/1990 | Hickey | 137/561 |
| 5,033,113 A | 7/1991 | Wang | |
| 5,114,313 A | 5/1992 | Vorus | |
| 5,244,349 A | 9/1993 | Wang | 416/5 |
| 5,253,979 A | 10/1993 | Fradenburgh | |
| D355,027 S | 1/1995 | Young | |
| 5,554,006 A * | 9/1996 | Liao | 416/235 |
| D382,636 S | 8/1997 | Yang | |
| 5,951,162 A | 9/1999 | Westman et al. | 416/223 |
| 6,045,327 A * | 4/2000 | Amr | 415/210.1 |
| 6,116,856 A * | 9/2000 | Karadgy et al. | 416/223 R |
| 6,206,641 B1 * | 3/2001 | Park et al. | 416/223 R |
| 6,250,886 B1 * | 6/2001 | Immell et al. | 416/219 A |
| 6,378,322 B1 * | 4/2002 | Calvert | 415/223 |
| 6,471,473 B1 * | 10/2002 | Wilkinson et al. | 415/220 |

FOREIGN PATENT DOCUMENTS

| | | | |
|---|---|---|---|
| AU | 19987 | 1/1930 | 416/223 |
| FR | 1050902 | 1/1954 | 416/223 |
| GB | 676406 | 7/1952 | 416/223 |
| GB | 925931 | 5/1963 | 416/223 |

* cited by examiner

*Primary Examiner*—Edward K. Look
*Assistant Examiner*—Igor Kershteyn
(74) *Attorney, Agent, or Firm*—Brian S. Steinberger; Law Offices of Brian S. Steinberger, P.A.

(57) ABSTRACT

Ceiling fan blades for maximizing air flow at operational speeds of up to approximately 200 revolutions per minute (rpm). The blades have a positive twist at the tip ends of approximately 5 degrees to approximately 10 degrees parallel to the ceiling. The root end of the blades closest to the motor can have a positive twist exceeding that of the tip end and can be approximately 20 to approximately 35 degrees parallel to the ceiling. The ceiling fans can have individual blade lengths of approximately 20 inches and overall spans of up to approximately 52 inches and up to approximately 54 inches. Each embodiment can use three, four, and five blades, with the blades being made of injection molded plastic. and the like. The embodiments can include built in light kit domes.

20 Claims, 16 Drawing Sheets

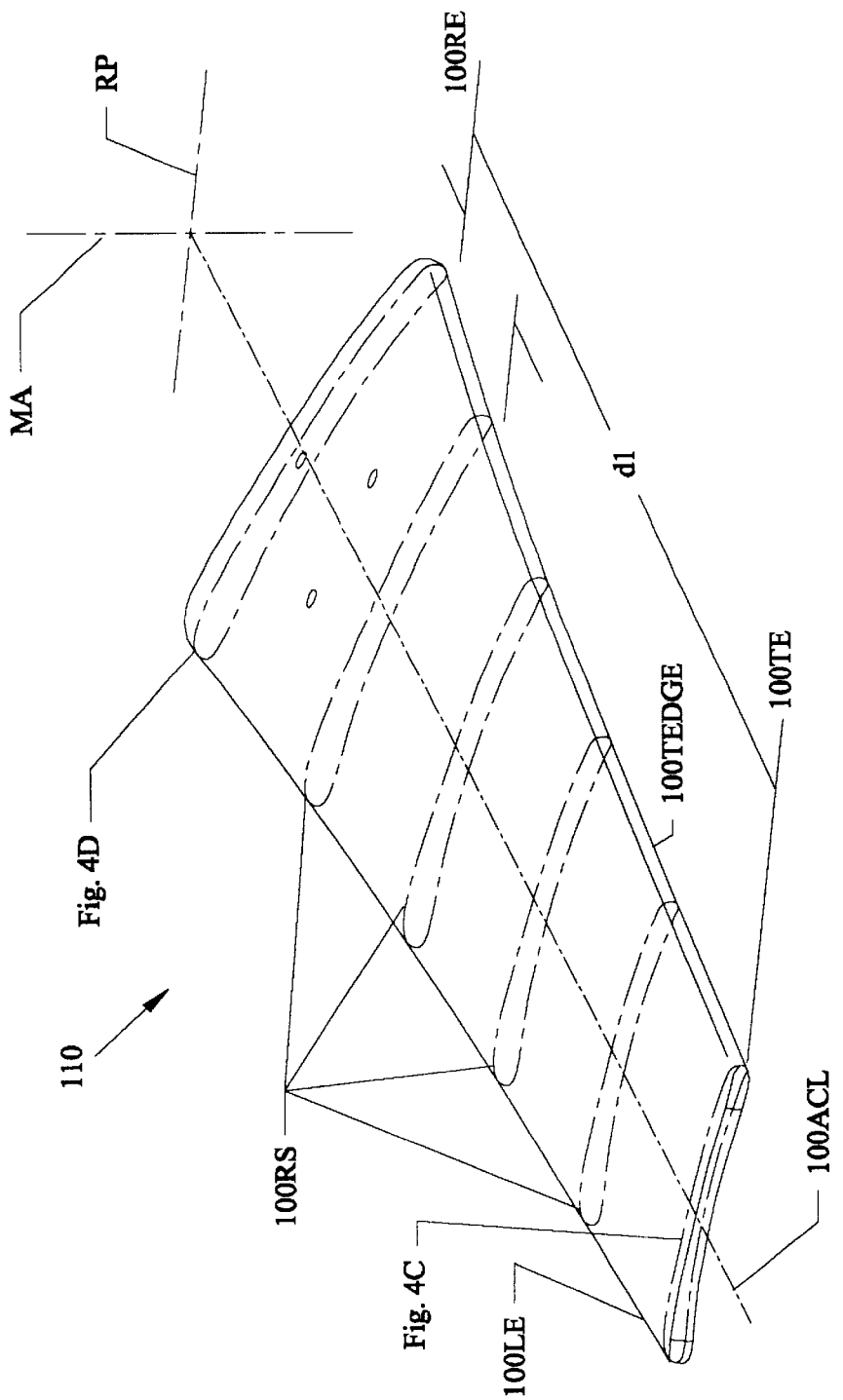

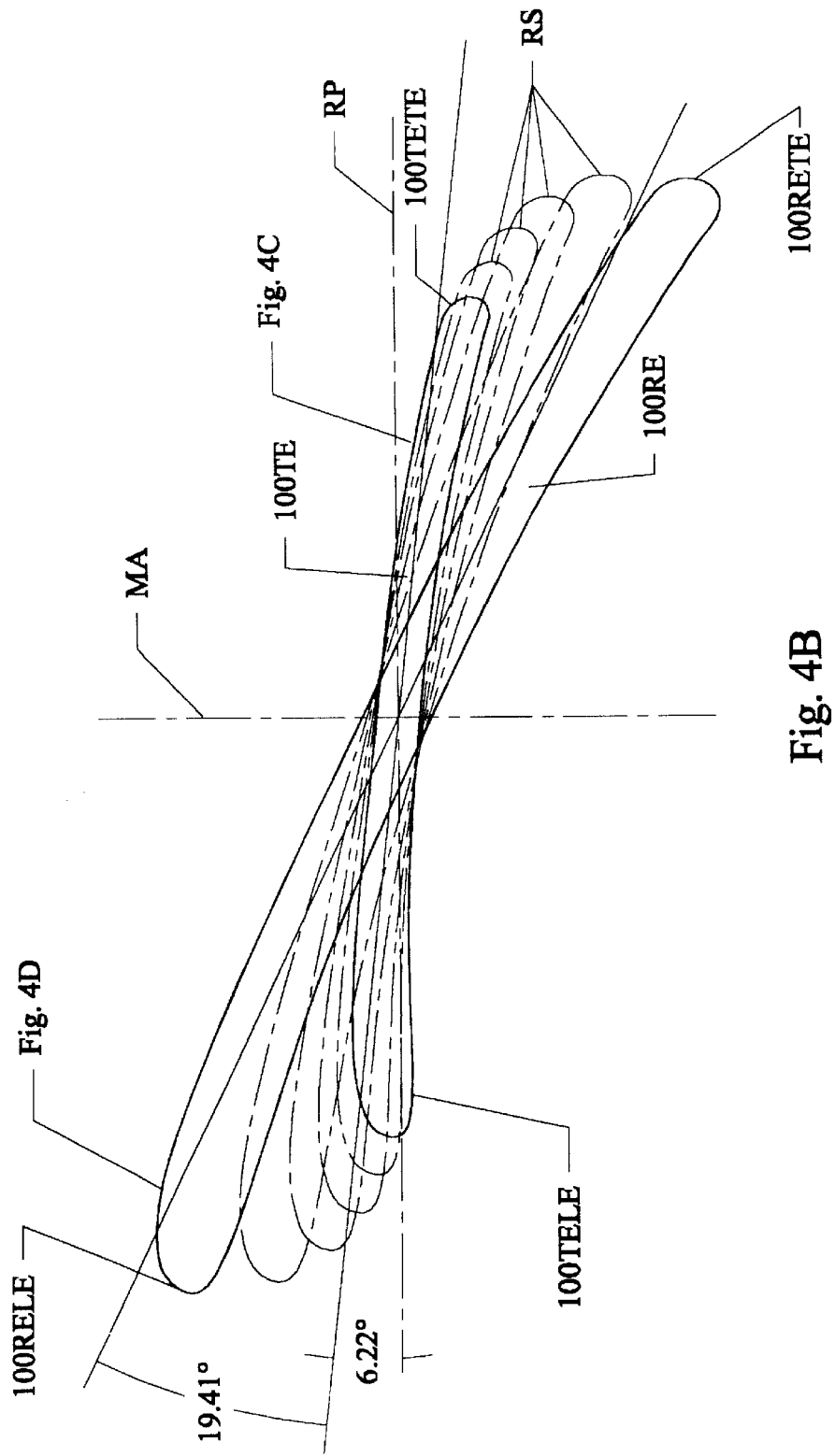

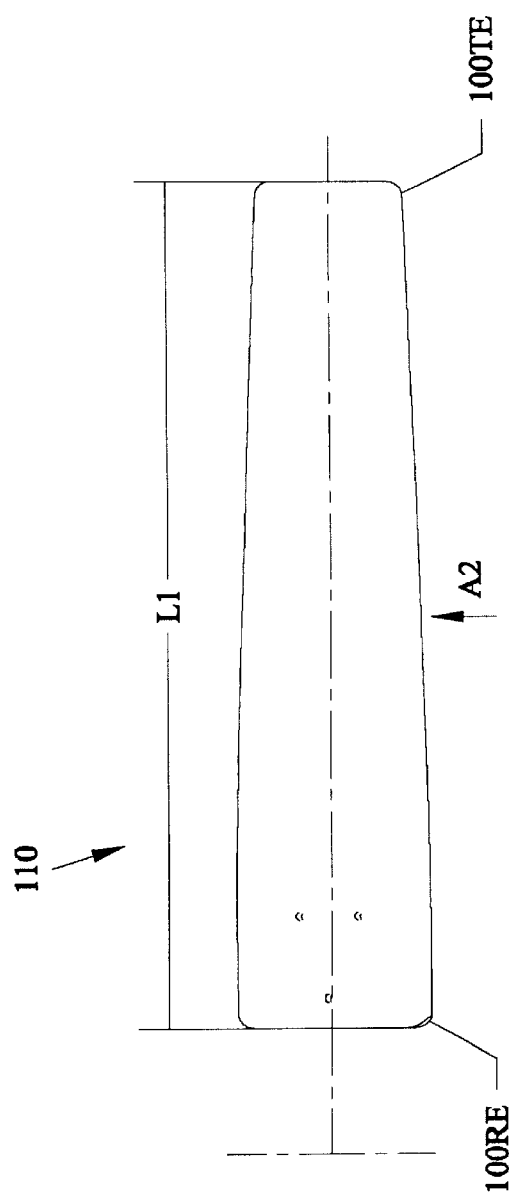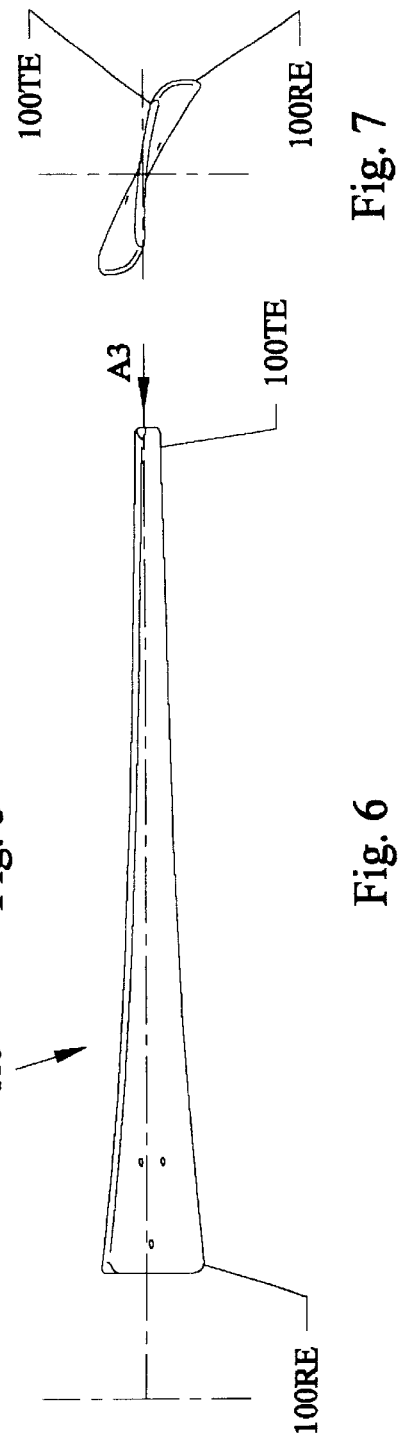
Fig. 5
Fig. 6
Fig. 7

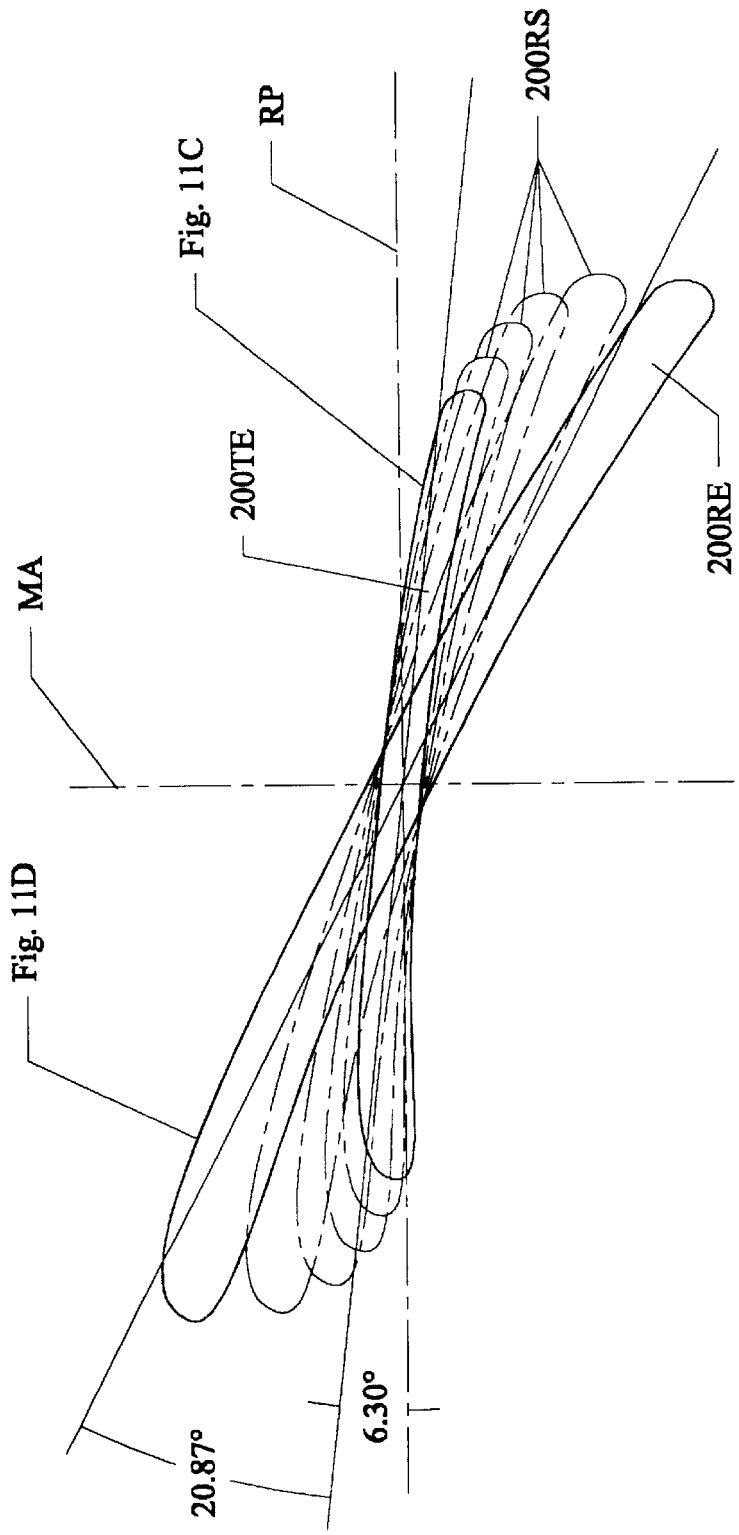

HIGH EFFICIENCY CEILING FAN BLADES

This invention relates to ceiling fans, and in particular to ceiling fan blades with twisted bodies for providing increased airflow at low rotational speeds with low energy consumption, and claims the benefit of Provisional Application No. 60/265,241 filed Jan. 31, 2001 and is a continuation-in-part of U.S. Ser. No. 09/711,599 filed Nov. 13, 2000, which is a divisional application of U.S. Ser. No. 09/415,883 filed Oct. 8, 1999 now U.S. Pat. No. 6,189,799, which is a divisional application of U.S. Ser. No. 09/067,236 filed Apr. 27, 1998 now U.S. Pat. No. 5,996,898 which is incorporated by reference, which is a continuation-in-part of U.S. Ser. No. 09/056,428 filed Apr. 7, 1998 now U.S. Pat. No. 6,039,541 which is incorporated by reference.

BACKGROUND AND PRIOR ART

Ceiling fans have been around for many years as a useful air circulator. The popular blade style over the years is a flat planar rectangular blade that can have a slight tilt, as shown for example in U.S. Pat. No. Des. 355,027 to Young and U.S. Pat. No. Des. 382,636 to Yang. These patents while moving air are not concerned with maximizing optimum downward airflow. Furthermore, many of the flat ceiling fan blades have problems such as vibrations and wobbling during use, and excessive noise that is noticeable to persons in the vicinity of the fan blades.

Aircraft, marine and automobile engine propeller type blades have been altered over the years to shapes other than flat rectangular. See for example, U.S. Pat. No. 1,903,823 to Lougheed; U.S. Pat. No. 1,942,688 to Davis; U.S. Pat. No. 2,283,956 to Smith; U.S. Pat. No. 2,345,047 to Houghton; U.S. Pat. No. 2,450,440 to Mills; U.S. Pat. No. 4,197,057 to Hayashi; U.S. Pat. No. 4,325,675 to Gallot et al.; U.S. Pat. No. 4,411,598 to Okada; U.S. Pat. No. 4,416,434 to Thibert; U.S. Pat. No. 4,730,985 to Rothman et al. U.S. Pat. No. 4,794,633 to Hickey; 4.844,698 to Gornstein; U.S. Pat. No. 5,114,313 to Vorus; and U.S. Pat. No. 5,253,979 to Fradenburgh et al.; Australian Patent 19,987 to Eather. However, these patents are describing devices that are generally used for high speed water, aircraft, and automobile applications where the propellers are run at high revolutions per minute (rpm) generally in excess of 500 rpm. None of these propellers are designed for optimum airflow at low speeds of less than approximately 200 rpm which is the desired speeds used in overhead ceiling fan systems.

Some alternative blade shapes have been proposed for other types of fans. See for example, U.S. Pat. No. 1,506,937 to Miller; U.S. Pat. No. 2,682,925 to Wosik; U.S. Pat. No. 4,892,460 to Volk; U.S. Pat. No. 5,244,349 to Wang; Great Britain Patent 676,406 to Spencer; and PCT Application No. WO 92/07192.

Miller '937 requires that their blades have root "lips 26" FIG. 1 that overlap one another, and would not be practical nor useable for three or more fan blade operation for a ceiling fan. Wosik '925 describes "fan blades . . . particularly adapted to fan blades on top of cooling towers such for example as are used in oil refineries and in other industries", column 1, lines 1–5, and does not describe any use for ceiling fan applications. The Volk '460 patent by claiming to be "aerodynamically designed" requires one curved piece to be attached at one end to a conventional planar rectangular blade. Using two pieces for each blade adds extreme costs in both the manufacturing and assembly of the ceiling itself. Furthermore, the grooved connection point in the Volk devices would appear to be susceptible to separating and causing a hazard to anyone or any property beneath the ceiling fan itself. Such an added device also has necessarily less than optimal aerodynamic properties.

Wang '349 requires each of their blades be "drilled with a plurality of perforations . . . for reducing weight . . . (and) may be reinforced by at least one rib . . . ", abstract. Clearly, such a blades would not be aesthetically pleasing to the user to have various holes and ribs visible on the blades, and there is no description for increasing airflow with such an arrangement. Great Britain Patent '406 describes "fan impellers" that require an "a unitary structure . . . constituted by a boss and four blades" page 1, lines 38+, and does not describe any single blades that can be used without any central boss type hub arrangement nor any use for less than three or more than four blade operation that will allow versatility for mounting separate numbers of blades on a ceiling fan motor. PCT '192 is for use "in an electric fan . . . to convert axially existing ambient air into a radially outward current of air", abstract, and is shown in FIGS. 5–12 as being used for being mounted on "post(s)", and the like, and is not directed toward a ceiling fan operation, which would direct air primarily downward. Additionally, PCT '192 generally requires an elaborate arrangement of using plural blades angled both upward and downward for operation.

Thus, the need exists for solutions to the above described problems in the prior art.

SUMMARY OF THE INVENTION

The first objective of the subject invention is to provide ceiling fan blades that are aerodynamically optimized to move up to approximately 40% or more air than traditional flat planar ceiling fan blades.

The second objective of the subject invention is to provide ceiling fan blades that are quieter and provide greater comfort than traditional flat planar ceiling fan blades.

The third objective of the subject invention is to provide ceiling fan blades that are less prone to wobble than traditional flat planar ceiling fan blades.

The fourth objective of the subject invention is to provide ceiling fan blades that reduce electrical power consumption and are more energy efficient over traditional flat planar ceiling fan blades.

The fifth objective of the subject invention is to provide ceiling fan blades designed for superior airflow at up to approximately 200 revolutions per minute(rpm).

The sixth objective of the subject invention is to provide ceiling fan blades being more aesthetically appealing than traditional flat planar ceiling fan blades.

Three embodiments of a novel ceiling fan blade are described where each blade can include a tip end having a twist of approximately 5 degrees to approximately 10 degrees, and a root end attached to a ceiling fan motor, wherein the positive twist provides increased air flow over other ceiling fan blades. The root end can include a twist of approximately 20 to approximately 35 degrees. The blades generally include a concave raised bottom and a convex shaped upper surface. The blades are mounted to motor assemblies in a twisted configuration. The blades can be mounted to a ceiling fan motor and provide enhanced airflow at speeds of up to approximately 200 revolutions per minute(rpm). The novel ceiling fan system includes wingspans of up to approximately 52 inches and up to approximately 54 inches.

Further objects and advantages of this invention will be apparent from the following detailed description of a presently preferred embodiment which is illustrated schematically in the accompanying drawings.

BRIEF DESCRIPTION OF THE FIGURES

FIG. 4A is a perspective view of a single fan blade of the first embodiment of FIGS. 1–3.

FIG. 4B is an end view of the single fan blade of FIG. 4A representing degrees of twist between from the root end to the tip end.

FIG. 5 is a top view of a ceiling fan blade of the first embodiment of FIGS. 1–4D.

FIG. 6 is a side view of the ceiling fan blade of FIG. 5 along arrow A2.

FIG. 7 is an end view of the ceiling fan blade of FIG. 6 along arrow A3.

FIG. 11B is an end view of the single fan blade of FIG. 11A representing degrees of twist between from the root end to the tip end.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

Testing of novel ceiling fan blades in the parent patent application to the subject invention, namely U.S. Pat. Ser. No. 09/056,428 filed Apr. 7, 1998, now U.S. Pat. No. 6,039,541, and incorporated by reference, were tested between May and June, 1997 at the Florida Solar Energy Center® in Cocoa, Florida, and included three parameters of measurement data: airflow(meters per second(m/s), power (in watts) and speed(revolutions per minute(rpm)). Those novel ceiling fan blades far surpassed the operating parameters of various conventional ceiling fans in operation, and the subject fan blades have similar attributes.

FIRST EMBODIMENT

Figure 1:
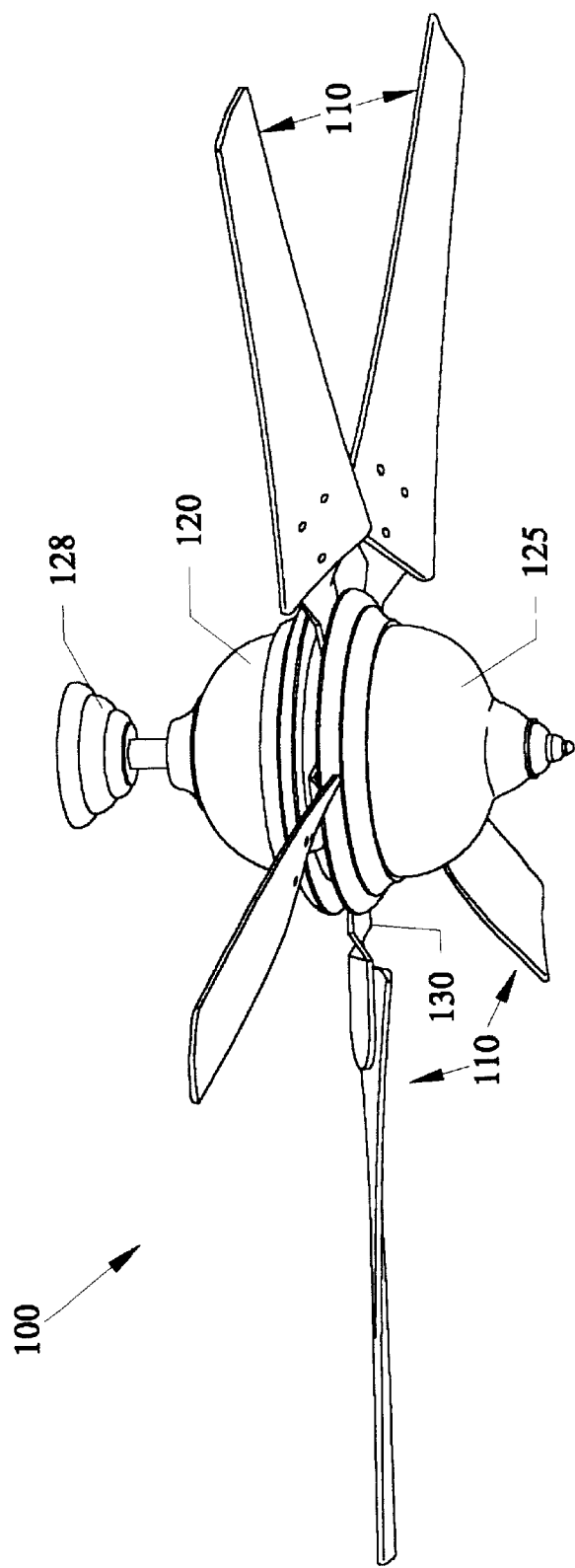
FIG. 1 is a perspective view of a first embodiment of the novel blades with motor assembly.
Figure 2:
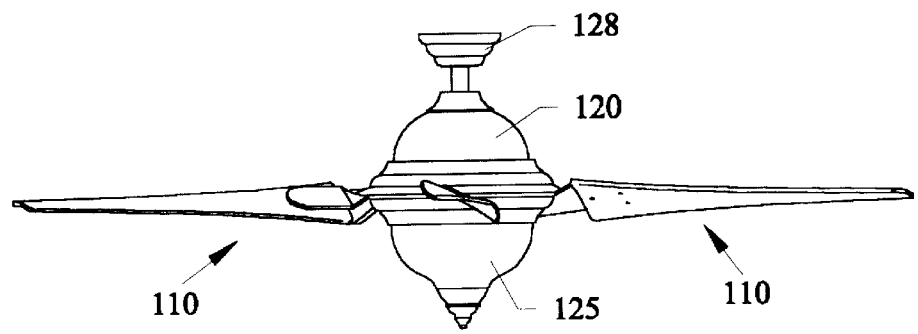
FIG. 2 is a side view of the first embodiment of FIG. 1.
Figure 3:
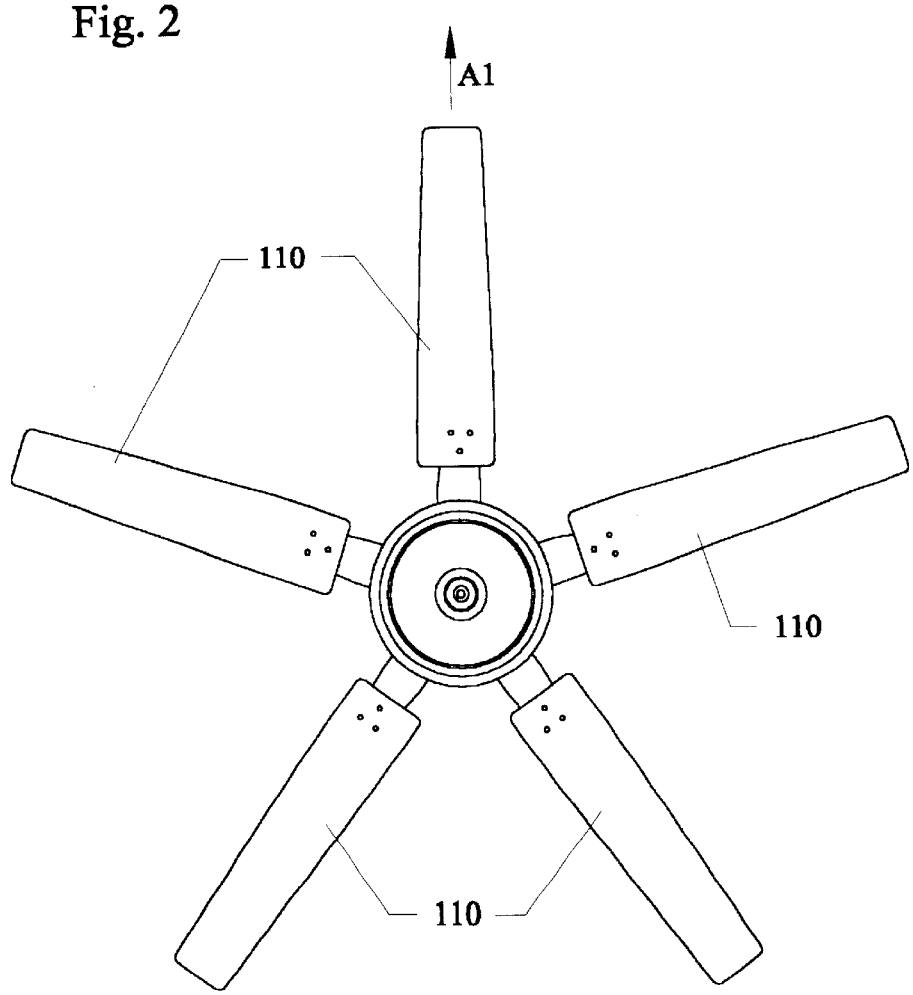
FIG. 3 is a top view of the first embodiment of FIG. 2 along arrow A1.

FIG. 1 is a perspective view of a first embodiment 100 of a first embodiment of the novel twisted blades 110. twisted mounting arm 130 conventionally mounted to motor assembly 120, light kit dome 125, such as a incandescent bulb, and the like, and ceiling mount 128. FIG. 2 is a side view of the first embodiment 100 of FIG. 1. FIG. 3 is a top view of the first embodiment 100 of FIG. 2 along arrow A1.

FIG. 4A is a perspective view of a single fan blade 110 of the first embodiment 100 of FIGS. 1–3, showing the single fan blade 110 having an overall length D1, between tip end 100TE and root end 100RE being approximately 19.50 inches, and various reference cross-sections(100TE, 100RS (4), 100RE) being approximately 3.90 inches from one another along the airfoil center line 100ACL, and blade 110 having leading edge 100LE and trailing edge 100TEDGE oriented along the blade rotational plane RP. FIG. 4B is an end view of the single fan blade 110 of FIG. 4A representing degrees of twist between from the root end 100RE to the tip end 100TE, when the blade 110 is positioned in a selected position shown in FIGS. 1–3(Note the twisted mounting arm 130 of FIG. 1 is used to hold the twist position shown in FIG. 4B). The tip end 100TE has an angle of approximately 6.22 degrees from a horizontal plane that is parallel to a ceiling. In other words, the angle would be approximately 6.22 degrees from the motor axis(MA)(being the rotational axis of the blades. The root end 100RE would have an angle of twist of approximately 25.63 degrees(19.41+6.22). The mid cross-sectional areas noted as 100RS have varying angles of twist between the tip end 100TE and the root end 200RE.

Figure 4D:
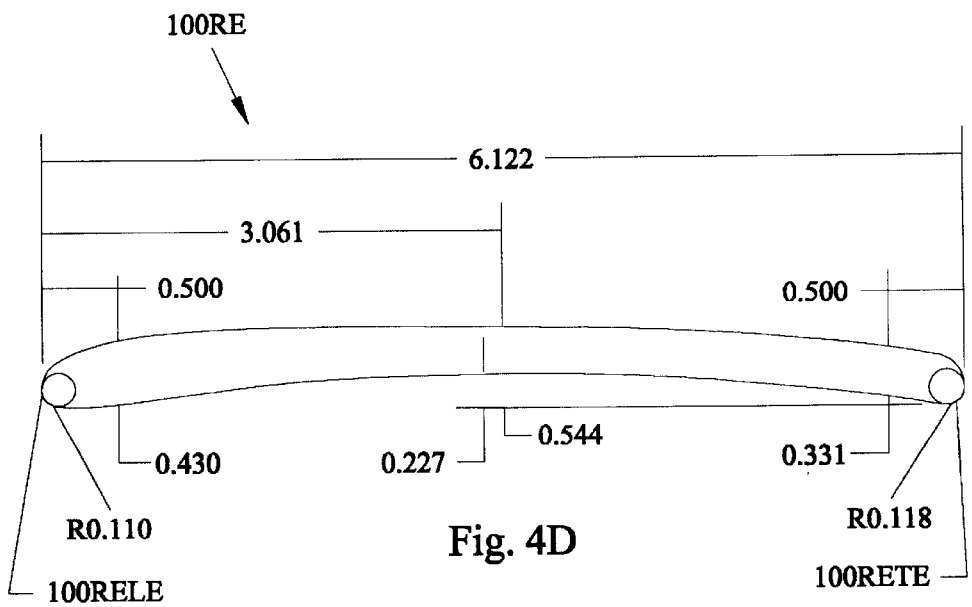
FIG. 4D is a cross-sectional view of the root end of the first embodiment of FIGS. 4A–4B.
Figure 4C:
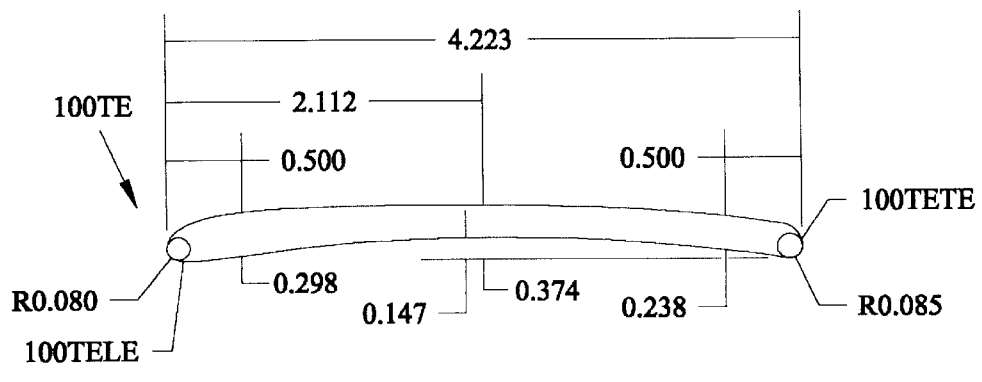
FIG. 4C is a cross-sectional view of the tip end of the first embodiment of FIGS. 4A–4B.

FIG. 4C is a cross-sectional view of the tip end 100 TE of the first embodiment 100 of FIGS. 4A–4B. Referring to FIG. 4C, tip end 100TE has a width span of approximately 4.223 inches. The rounded leading edge 100TELE has a diameter of approximately 0.080 degrees being approximately 0.298 inches thick and approximately 0.5 inches from rounded leading edge 100TELE. The middle of tip end 100 TE has a thickness of approximately 0.227 inches (0.374–0.147), with a generally concave shaped elongated bottom section raised approximately 0.147 inches and upper surface being generally convex shaped. Rounded tip end trailing edge 100TETE has a diameter of approximately 0.085 degrees with a thickness of approximately 0.238 inches approximately 0.5 inches from the rounded trailing edge 100TETE.

FIG. 4D is a cross-sectional view of the root end 100 RE of the first embodiment 100 of FIGS. 4A–4B. Referring to FIG. 4D, root end 100RE has a width span of approximately 6.122 inches. The rounded leading edge 100RELE has a diameter of approximately 0.110 degrees being approximately 0.430 inches thick approximately 0.5 inches from rounded leading edge 100RELE. The middle of root end 100 RE has a thickness of approximately 0.317(0.544–0.227) inches, with a generally concave shaped elongated bottom section raised midway approximately 0.227 inches and upper surface being generally convex shaped. Rounded tip end trailing edge 100RETE has a diameter of approximately 0.118 degrees with a thickness of approximately 0.331 inches approximately 0.5 inches from the rounded trailing edge 100RETE.

FIG. 5 is a top view of a ceiling fan blade 110 of the first embodiment 100 of FIGS. 1–4D, where the length, L1 can be approximately 19.5 inches to approximately 20.228 inches from tip end 100TE to root end 200 RE. FIG. 6 is a side view of the ceiling fan blade 110 of FIG. 5 along arrow A2. FIG. 7 is an end view of the ceiling fan blade 110 of FIG. 6 along arrow A3.

SECOND EMBODIMENT

Figure 8:
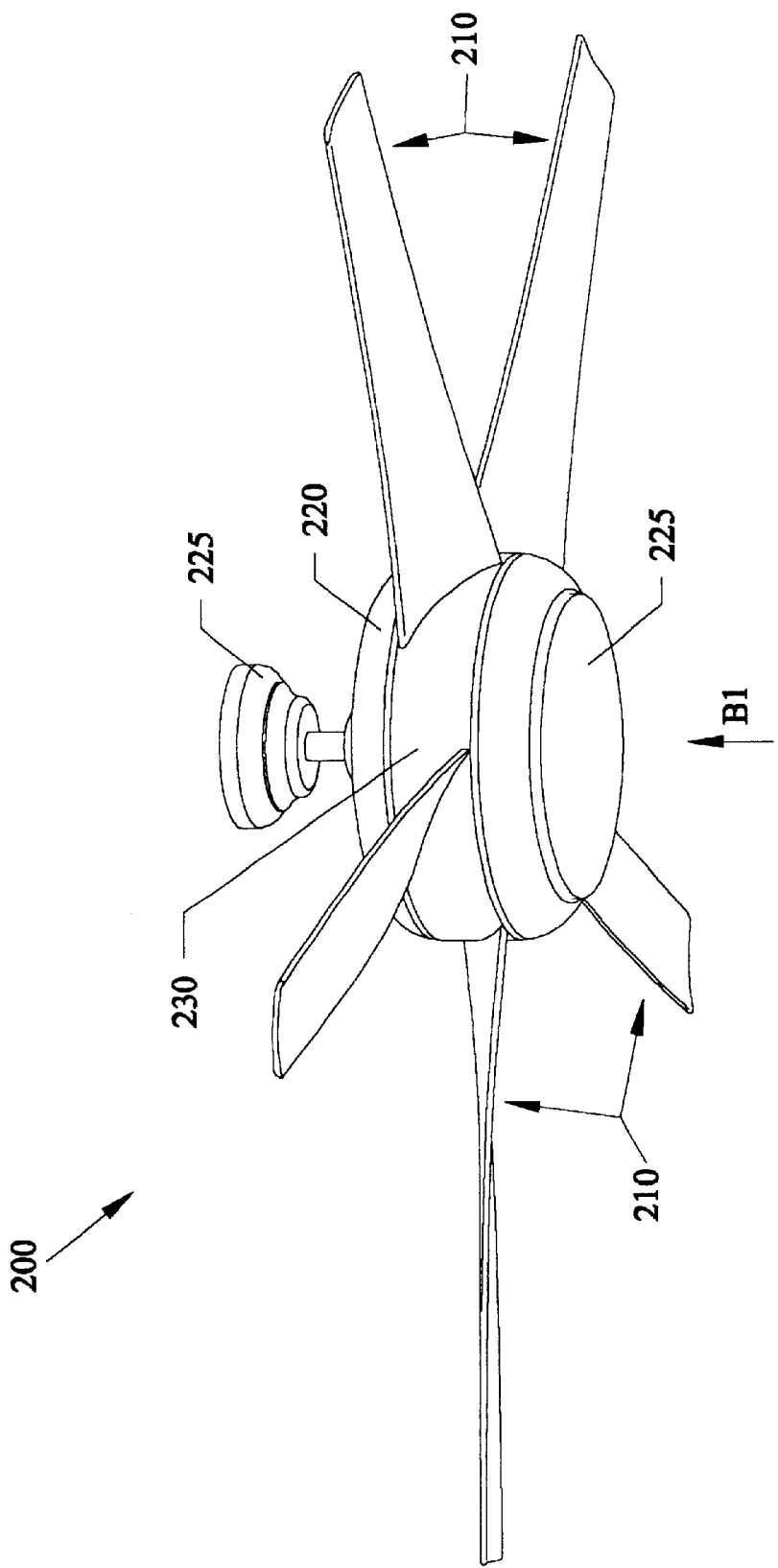
FIG. 8 is a perspective view of a second embodiment of the novel blades with motor assembly.

FIG. 8 is a perspective view of a second embodiment 200 of the novel blades 210 attached to a mounting ring 230 which rotates relative to conventional motor assembly 220. A dome shaped light 225 can also be used.

Figure 9:
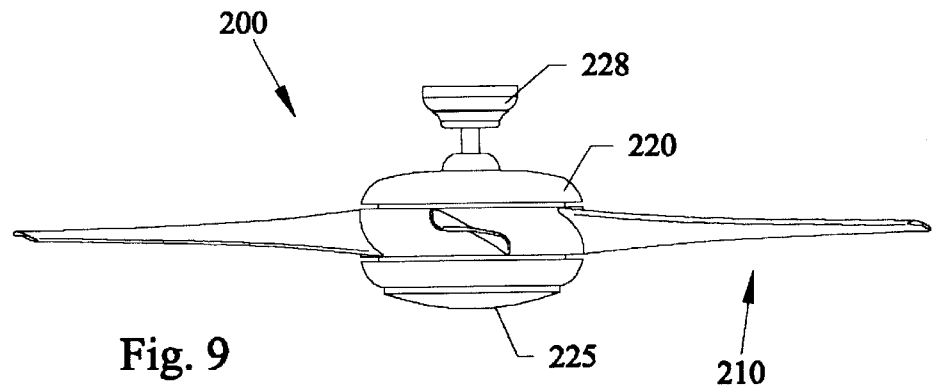
FIG. 9 is a side view of the second embodiment of FIG. 8.
Figure 10:
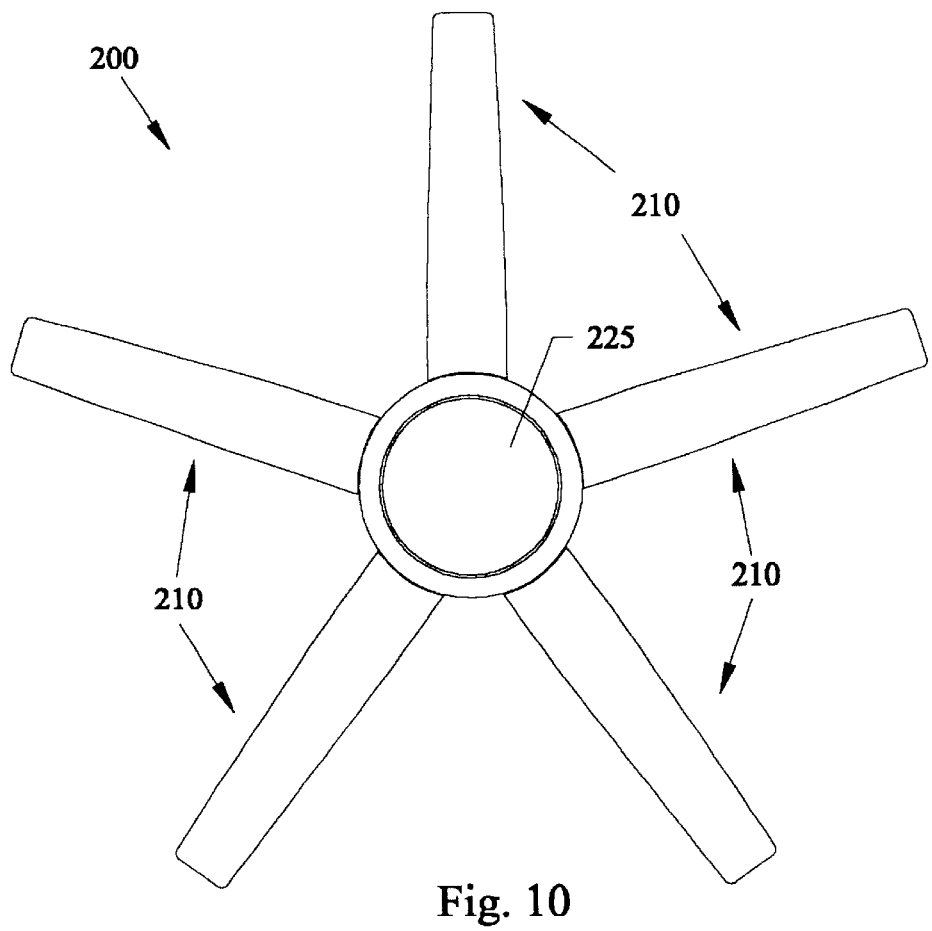
FIG. 10 is a top view of the second embodiment of FIG. 9 along arrow B1.

FIG. 9 is a side view of the second embodiment 200 of FIG. 8. FIG. 10 is a top view of the second embodiment 200 of FIG. 9 along arrow B1.

Figure 11A:
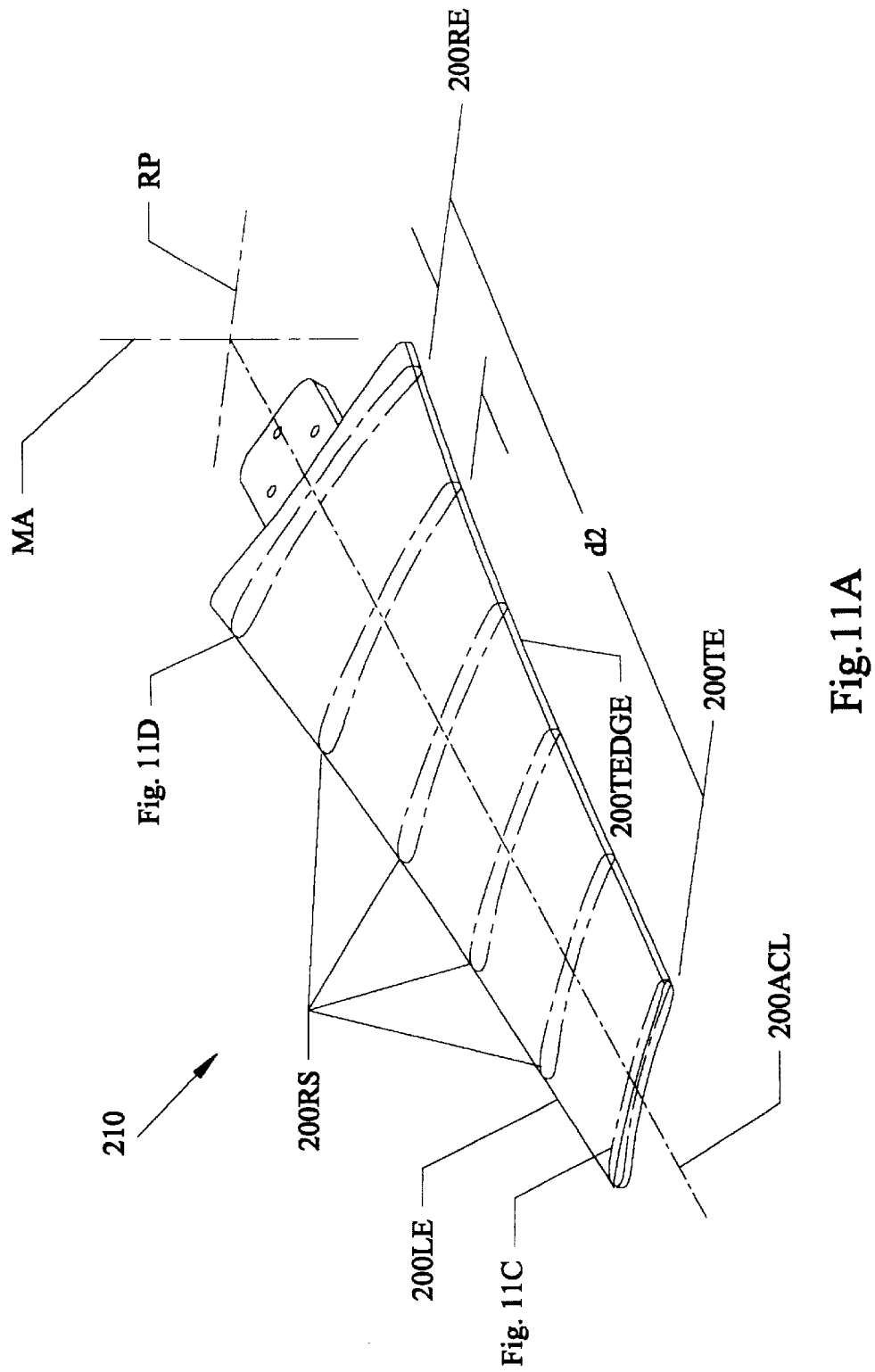
FIG. 11A is a perspective view of a single fan blade of the second embodiment of FIGS. 8–10.

FIG. 11A is a perspective view of a single fan blade 210 of the second embodiment 200 of FIGS. 8–10 showing the single fan blade 210 having an overall length D2 between tip end 200TE and root end 200RE being approximately 20 inches, and various reference cross-sections(200TE, 200RS(4), 200RE) being approximately 4 inches from one another along air foil center line 200ACL, and blade 210 having leading edge 200LE and trailing edge 200TEDGE oriented along the blade rotational plane RP. FIG. 11B is an end view of the single fan blade 210 of FIG. 11A representing degrees of twist between from the root end 200RE to the tip end 200TE when the blade 210 is positioned in a selected position shown in FIGS. 8–10. The tip end 200 TE has an angle of approximately 6.30 degrees from a horizontal plane that is parallel to the ceiling. In other words, the angle would be approximately 6.3 degrees from a motor axis(MA). The root end 200RE would have an angle of twist of approximately 27.17 degrees(6.3+20.87). The mid cross-sectional areas noted as 200RS have varying angles of twist between the tip end 200TE and the root end 200RE.

Figure 11D:
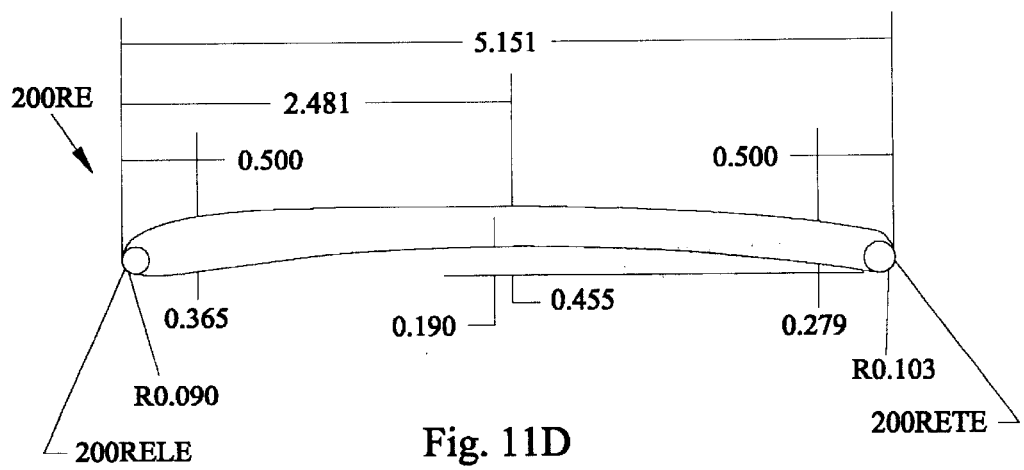
FIG. 11D is a cross-sectional view of the root end of the second embodiment of FIGS. 11A–11B.
Figure 11C:
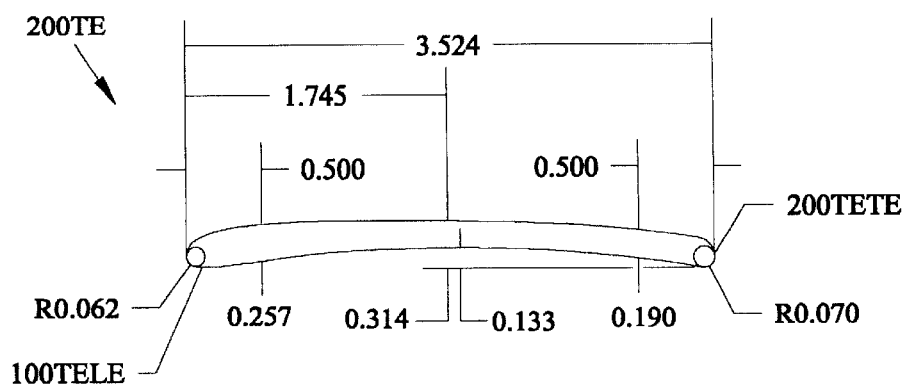
FIG. 11C is cross-sectional view of the tip end of the second embodiment of FIGS. 11A–11B.

FIG. 11C is cross-sectional view of the tip end 200TE of the second embodiment 200 of FIGS. 11A–11B. Referring to FIG. 11C, tip end 200TE has a width span of approximately 3.524 inches. The rounded leading edge 200TELE has a diameter of approximately 0.062 degrees being approximately 0.257 inches thick approximately 0.5 inches from leading edge 200TELE. The middle of tip end 200TE has a thickness of approximately 0.181 inches(0.314–0.133), with a generally concave shaped elongated bottom section raised approximately 0.133 inches and an upper surface being generally convex shaped. Rounded tip end trailing edge 200TETE has a diameter of approximately 0.070 inches with a thickness of approximately 0.190 inches approximately 0.5 inches from the rounded trailing edge 200TETE.

FIG. 11D is a cross-sectional view of the root end 200RE of the second embodiment 200 of FIGS. 11A–11B. Referring to FIG. 11D, root end 200RE has a width span of approximately 5.151 inches. The rounded leading edge 200RELE has a diameter of approximately 0.090 degrees being approximately 0.365 inches thick approximately 0.5 inches from rounded leading edge 200RELE. The middle of root end 200RE has a thickness of approximately 0.265 inches(0.455–0.190), with a generally concave shaped elongated bottom section raised midway approximately 0.190 inches and an upper surface being generally convex shaped. Rounded tip end trailing edge 200RETE has a diameter of approximately 0.103 degrees with a thickness of approximately 0.279 inches approximately 0.5 inches from rounded trailing edge 200RETE.

Figure 14:
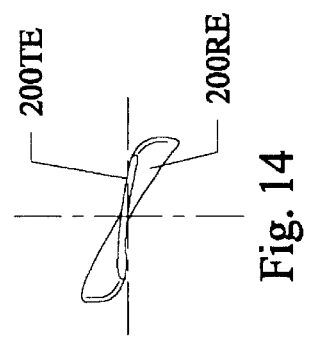
FIG. 14 is an end view of the ceiling fan blade of FIG. 13 along arrow B3.
Figure 12:
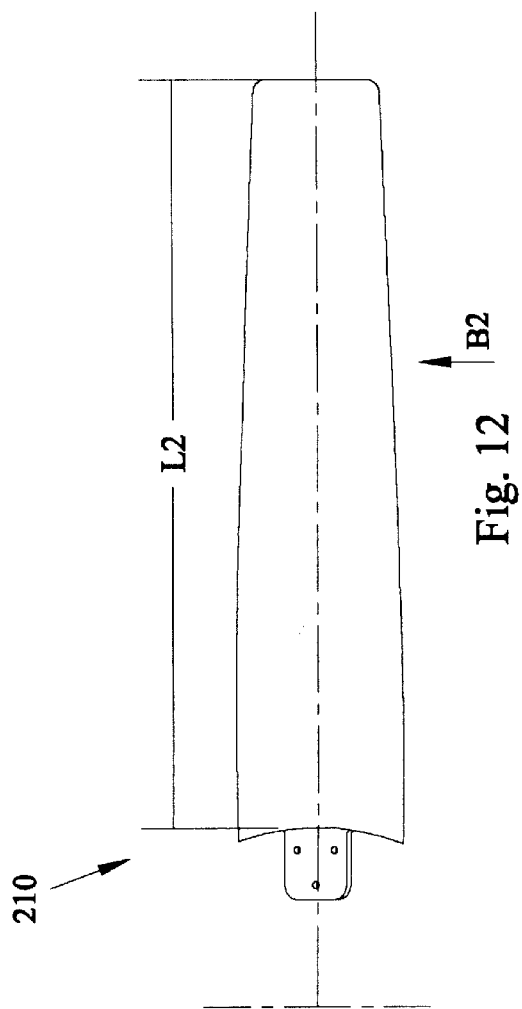
FIG. 12 is a top view of a ceiling fan blade of the second embodiment of FIGS. 11A–11D.
Figure 13:
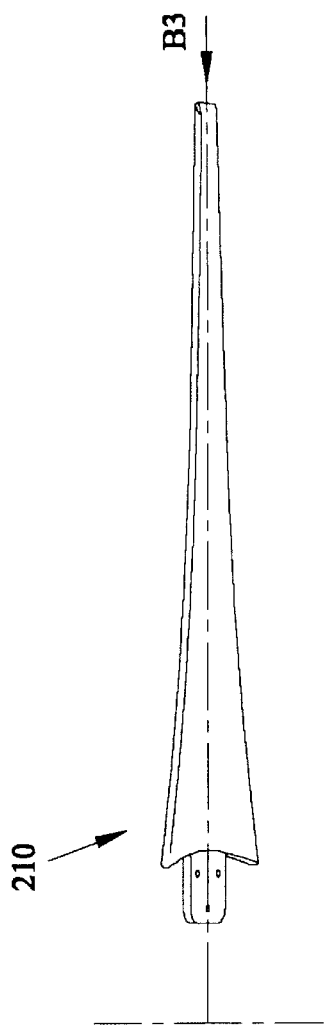
FIG. 13 is a side view of the ceiling fan blade of FIG. 12 along arrow B2.

FIG. 12 is a top view of a ceiling fan blade 210 of the second embodiment 200 of FIGS. 11A–11D, where the length L2 can be approximately 20 inches to approximately 20.819 inches long from tip end 200TE to root end 200RE. FIG. 13 is a side view of the ceiling fan blade 210 of FIG. 12 along arrow B2. FIG. 14 is an end view of the ceiling fan blade 210 of FIG. 13 along arrow B3.

Subject invention second embodiment had an overall wing span of approximately 52", and used fan blades each being made of injection molded plastic.

Table 1 shows running the second embodiment of the subject invention at low speed operations, with the Power Drawer is the instantaneous electric power requirement in Watts. The parameters include power(in watts) and speed (revolutions per minute(rpm)).

TABLE 1

FAN (LOW SPEED OPERATION)

| | Power Draw | Revolutions Per Minute |
|---|---|---|
| Invention 2nd Embodiment | 17.9 Watts | 81 rpm |

Table 2 shows running the second embodiment of the subject invention at medium speed operations, with the Power Drawer is the instantaneous electric power requirement in Watts.

TABLE 2

FAN (MEDIUM SPEED OPERATION)

| | Power Draw | Revolutions Per Minute |
|---|---|---|
| Invention 2nd Embodiment | 38.6 Watts | 135 rpm |

Table 3 shows running the second embodiment of the subject invention at high speed operations, with the Power Drawer is the instantaneous electric power requirement in Watts.

TABLE 3

FAN (HIGH SPEED OPERATION)

| | Power Draw | Revolutions Per Minute |
|---|---|---|
| Invention 2nd Embodiment | 62.3 Watts | 176 rpm |

THIRD EMBODIMENT

Figure 15A:
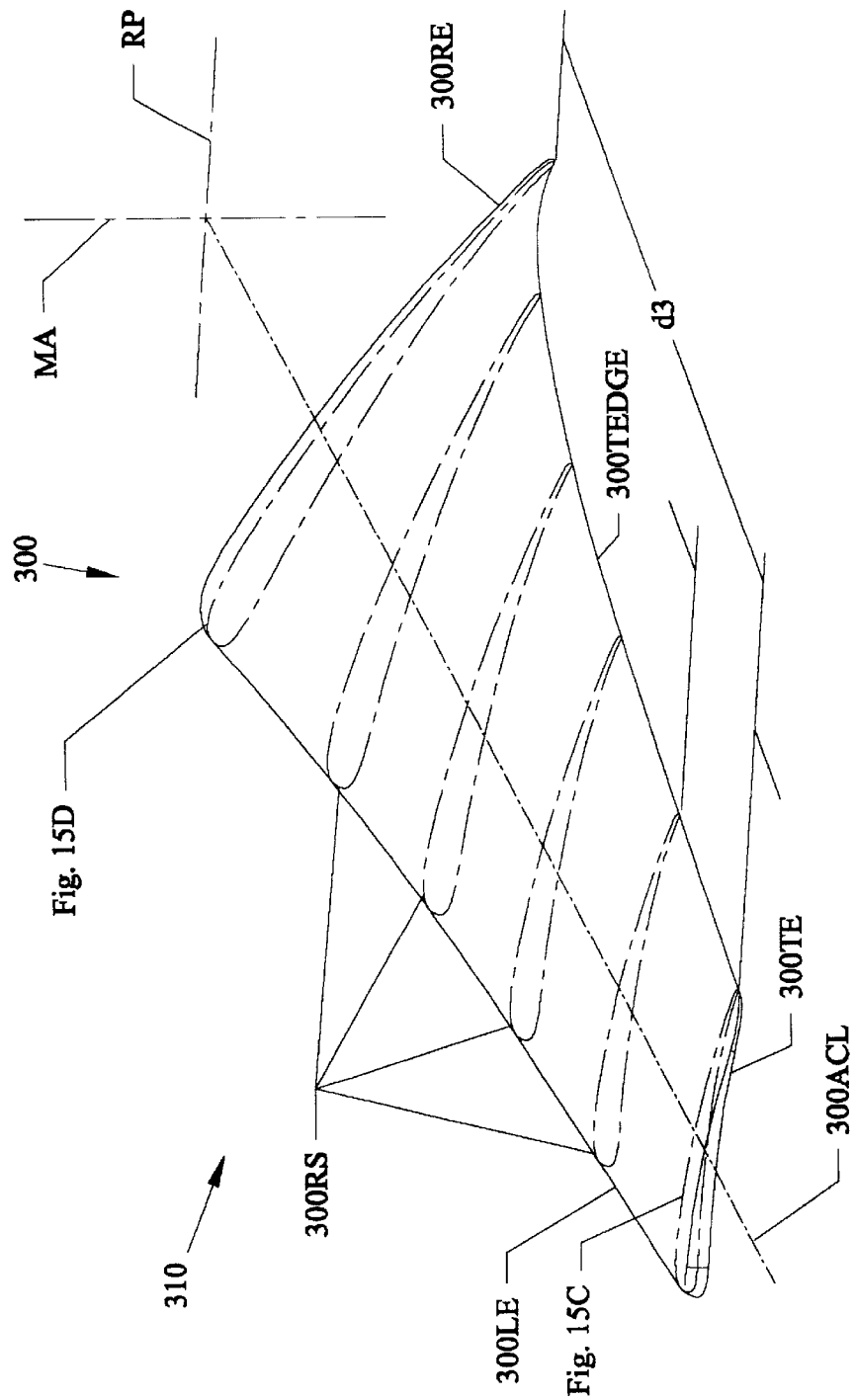
FIG. 15A is a perspective view of a single fan blade of a third embodiment of invention.
Figure 15B:
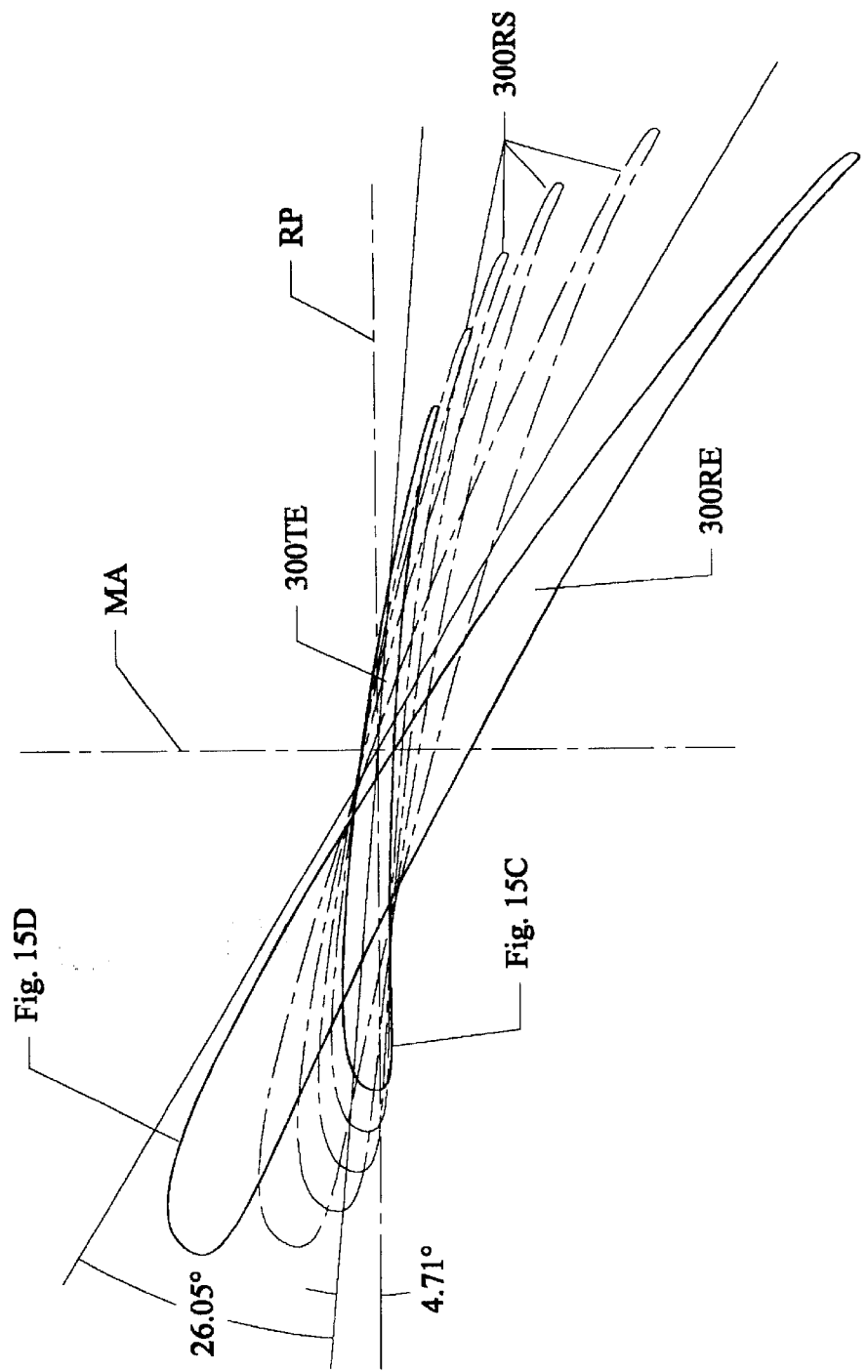
FIG. 15B is an end view of the single fan blade of FIG. 15A representing degrees of twist between from the root end to the tip end.

FIG. 15A is a perspective view of a single fan blade 310 of a third embodiment 300 of invention showing the single fan blade 310 having an overall length D3 between tip end 300TE and root end 300RE being approximately 23.5 inches, and various reference cross-sections(300RS(4), 300RE) being approximately 4.70 inches from one another along air foil center line 300ACL, and blade 310 having leading edge 300LE and trailing edge 300TEDGE oriented along the blade rotational plane RP. FIG. 15B is an end view of the single fan blade 310 of FIG. 15A representing degrees of twist between from the root end 300RE to the tip end 300TE, when the blade is positioned in a selected position on a ceiling fan motor assembly like those shown in the previous embodiments. The tip end 300TE has an angle of approximately 4.71 degrees from a horizontal plane that is parallel to the ceiling. In other words, the angle would be approximately 4.71 degrees from a motor axis(MA). The root end 200RE would have an angle of twist of approximately 30.76 degrees(4.71+26.05). The mid cross-sectional areas noted as 300RS have varying degrees of twist between the tip end 300TE and the root end 300RE.

Figure 15D:
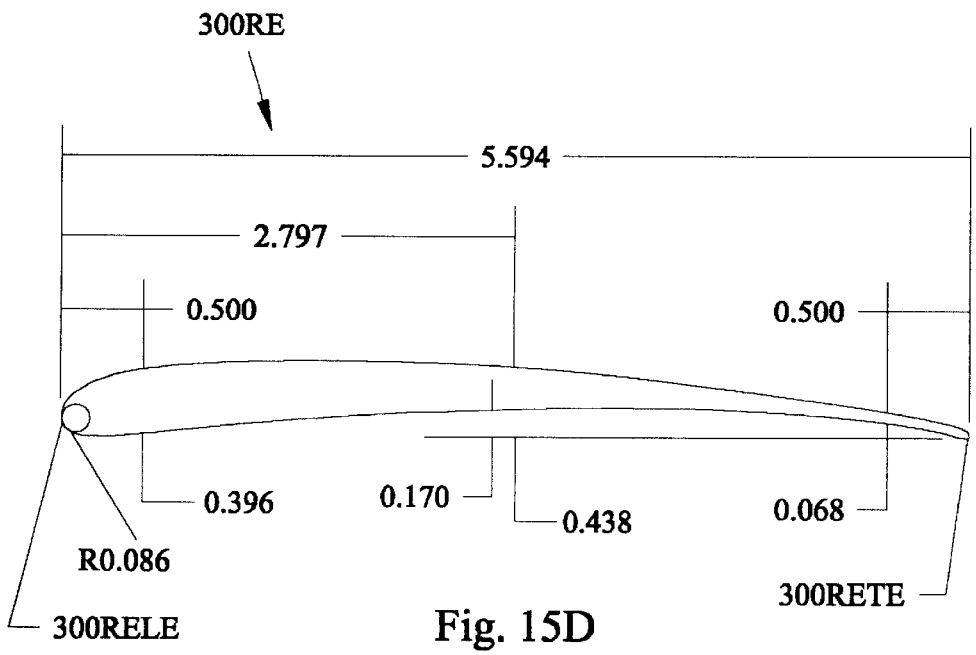
FIG. 15D is a cross-sectional view of the root end of the third embodiment of FIGS. 15A–15B.
Figure 15C:
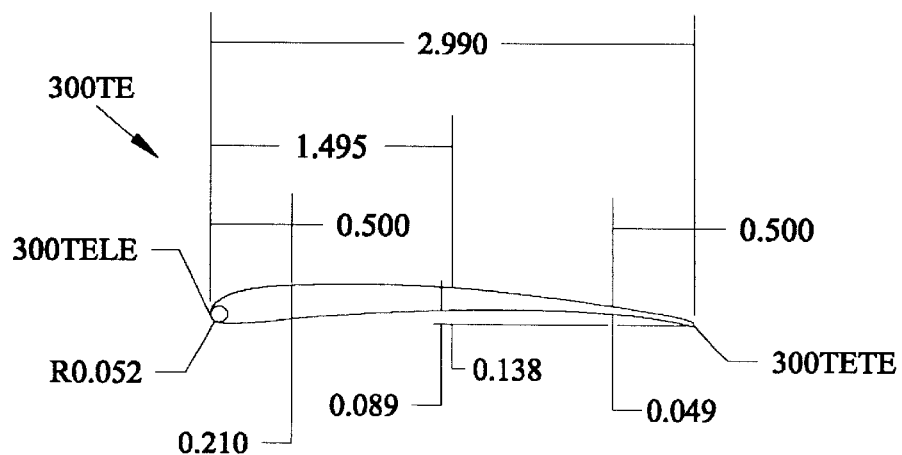
FIG. 15C is cross-sectional view of the tip end of the third embodiment of FIGS. 15A–15B.

FIG. 15C is cross-sectional view of the tip end 300TE of the third embodiment 300 of FIGS. 15A–15B. Referring to FIG. 15C, tip end 300TE has a width span of approximately 2.990 inches. The rounded leading edge 300TELE has a diameter of approximately 0.052 degrees being approximately 0.210 inches thick approximately 0.5 inches from the leading edge 300TELE. The middle of tip end 300TE has a thickness of approximately 0.049 inches(0.138–0.089), with a generally concave shaped elongated bottom section raised approximately 0.089 inches and upper surface being generally convex shaped. Rounded tip end trailing edge 300TETE has a diameter of approximately 0.049 inches approximately 0.5 inches from rounded trailing edge 300TETE.

FIG. 15D is a cross-sectional view of the root end 300RE of the third embodiment 300 of FIGS. 15A–15B. Referring to FIG. 15D, root end 300RE has a width span of approximately 5.594 inches. The rounded leading edge 300RELE has a diameter of approximately 0.086 degrees being approximately 0.396 inches thick approximately 0.5 inches from leading edge 300RELE. The middle of root end 300RE has a thickness of approximately 0.268 inches(0.438–0.170), with a generally concave shaped elongated bottom section raised midway approximately 0.170 inches, and an upper surface being generally convex shaped. Rounded tip end trailing edge 300RETE can have a blunt, and/or rounded tip with a thickness of approximately 0.068 inches approximately 0.5 inches from the trailing edge 300RETE.

Figure 16:
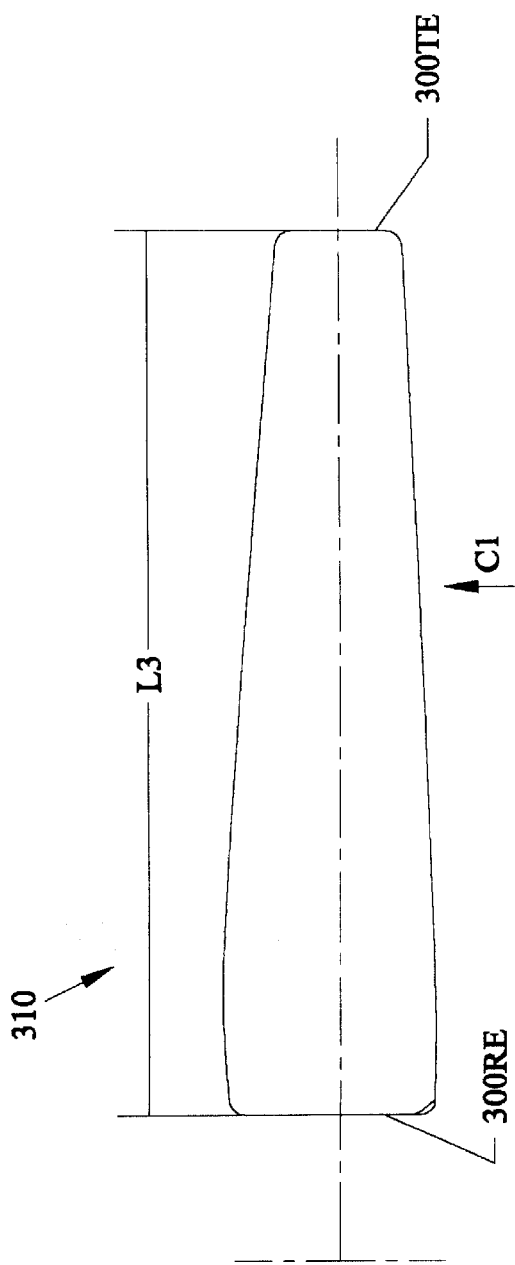
FIG. 16 is a top view of a ceiling fan blade of the third embodiment of FIGS. 15A–15D.
Figure 17:
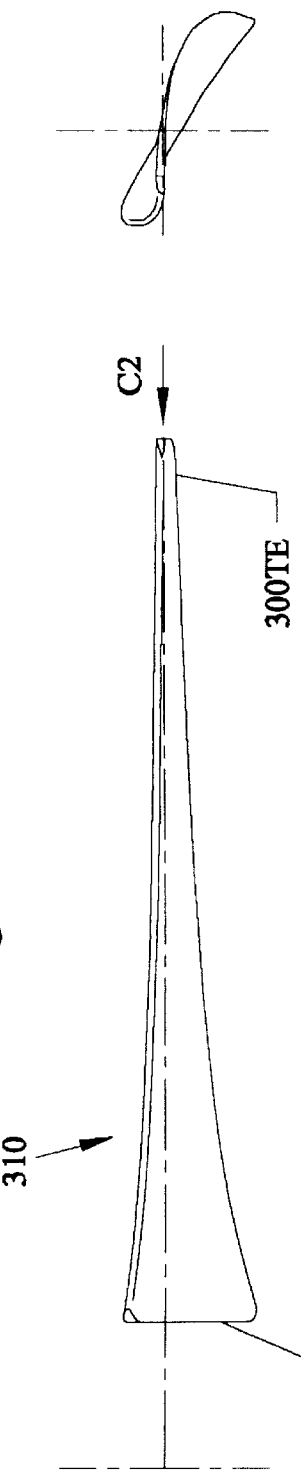
FIG. 17 is a side view of the ceiling fan blade of FIG. 16 along arrow C1.
Figure 18:
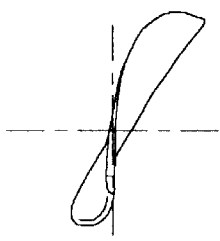
FIG. 18 is an end view of the ceiling fan blade of FIG. 17 along arrow C2.

FIG. 16 is a top view of a ceiling fan blade 310 of the third embodiment 300 of FIGS. 15A–15D, having a length L3 of approximately 23.5 inches to approximately 24.5 inches between the root end 300RE and the tip end 300TE. FIG. 17 is a side view of the ceiling fan blade 310 of FIG. 16 along arrow C1. FIG. 18 is an end view of the ceiling fan blade 310 of FIG. 17 along arrow C2.

The subject invention allows for maximizing air flow for ceiling fans having wing spans of up to approximately 52 and approximately 54 inches, with the blades shaped to maximize downward air flow at RPMs of up to approximately 200RPM.

While the invention has been described. disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A ceiling fan blade for use in overhead ceiling fans, the blade comprising:

a tip end having a twist of approximately 5 degrees to approximately 10 degrees; and a root end attached to a ceiling fan motor, wherein the positive twist provides increased air flow over other ceiling fan blades.

2. The ceiling fan blade of claim 1, wherein the twist on the tip end is:

approximately 6 to approximately 9 degrees.

3. The ceiling fan blade of claim 1, wherein the root end includes:

a twist of approximately 20 to approximately 35 degrees.

4. The ceiling fan blade of claim 1, wherein the root end includes:

a twist of approximately 25 to approximately 30 degrees.

5. The ceiling fan blade of claim 1, wherein the blade further includes:

means for operating the motor for rotating the blade up to approximately 200 revolutions per minute(rpm).

6. The ceiling fan blade of claim 1, wherein the blade includes:

a longitudinal length between the tip end and the root end, the tip end extending outward and facing away from the motor, the root end having a width being adjacent to the motor, the longitudinal length between the tip end and the root end being substantially greater than the width of the root end adjacent to the motor.

7. A ceiling fan system, comprising:

a first blade having a twist between a root end and a tip end;

a second blade having a twist between a root end and a tip end; and a ceiling fan motor attached to the root ends of the first blade and the root end of the second blade for rotating the first blade and the second blade, wherein the first blade and the second blade provide increased airflow over other blades.

8. The ceiling fan system of claim 7, wherein the tip end of each of the first blade and the second blade include: a twist of approximately 5 to approximately 10 degrees.

9. The ceiling fan system of claim 8, wherein the root end of each of the first blade and the second blade include: a twist of approximately 20 to approximately 35 degrees.

10. The ceiling fan system of claim 8, wherein the root end of each of the first blade and the second blade include: a twist of approximately 25 to approximately 30 degrees.

11. The ceiling fan system of claim 7, wherein the tip end of each of the first blade and the second blade include: a twist of approximately 6 to approximately 9 degrees.

12. The ceiling fan system of claim 7, wherein the motor further includes:

means for rotating the first blade and the second blade up to approximately 200 revolutions per minute(rpm).

13. The ceiling fan system of claim 7, wherein the system includes:

a wingspan of up to approximately 52 inches.

14. The ceiling fan system of claim 7, wherein the system includes:

a wingspan of up to approximately 54 inches.

15. The ceiling fan system of claim 7, wherein each of the first blade and the second blade includes:

a longitudinal length between the tip end and the root end, the tip end facing outward and extending away from the motor, the root end having a width being adjacent to the motor, the longitudinal length between the tip end and the root end being substantially greater than the width of the root end adjacent to the motor.

16. The ceiling fan system of claim 7, wherein the first blade twist and the second blade twist each include:

a root twist portion adjacent to the root end of the blade; and a tip twist portion adjacent to the tip end of the blade, the root twist portion being greater than the tip twist portion.

17. A method of operating an overhead ceiling fan system, comprising the steps of:

(a) rotating at least two fan blades attached to a ceiling fan motor at a speed of up to approximately 200 revolutions per minute(rpm); and (b) generating a downward airflow of up to approximately 6500 CFM from the rotating blades, wherein the ceiling fan system enhances axial air flow.

18. The method of claim 17, further comprising the step of:

providing the blades and the attached ceiling fan motor with a wingspan of up to approximately 52 inches.

19. The method of claim 17, further comprising the step of:

providing the blades and the attached ceiling fan motor with a wingspan of up to approximately 54 inches.

20. The method of claim 17, further comprising the step of:

providing each of the at least two blades with a twist between a blade root end adjacent to the motor to a blade tip end facing outward and extending away from the motor.

* * * * *